United States Patent

[11] 3,634,861

| [72] | Inventor | Olof Henrik Hallstrom<br>Schatzmeisterstrasse 5, 2 Hamburg 70, Germany |
|---|---|---|
| [21] | Appl. No. | 7,862 |
| [22] | Filed | Feb. 2, 1970 |
| [45] | Patented | Jan. 11, 1972 |
| [32] | Priority | Feb. 4, 1969 |
| [33] | | Sweden |
| [31] | | 1480/69 |

[54] CARGO-CONVEYING CARTRIDGE FOR PNEUMATIC CYLINDRICAL TUBE CONVEYING SYSTEM
5 Claims, 5 Drawing Figs.

[52] U.S. Cl. .................................................. 243/32, 243/39, 243/35
[51] Int. Cl. ...................................................... B65g 51/06

[50] Field of Search ............................................ 243/32, 38

[56] References Cited
UNITED STATES PATENTS

| 91,513 | 6/1869 | Brisbane ...................... | 243/32 |
| 723,457 | 3/1903 | Gipe ............................ | 243/39 |
| 431,901 | 7/1890 | Leake ........................... | 243/39 |
| 3,352,512 | 11/1967 | James ........................... | 243/32 |
| 868,479 | 10/1907 | Railey .......................... | 243/39 |

FOREIGN PATENTS

| 33,036 | | Germany .................. | 243/32 |

*Primary Examiner*—Harvey C. Hornsby
*Attorney*—Spencer & Kaye

ABSTRACT: A pneumatically propelled conveying cartridge having spherical sealing portions.

PATENTED JAN 11 1972 3,634,861

INVENTOR
Olof Henrik Hallström

BY Spencer & Kaye
ATTORNEYS.

3,634,861

CARGO-CONVEYING CARTRIDGE FOR PNEUMATIC CYLINDRICAL TUBE CONVEYING SYSTEM

BACKGROUND OF THE INVENTION

This invention relates to conveying systems in which a conveying cartridge enclosing the material to be conveyed is propelled in a tube system under the action of positive or negative pressure. The invention specifically relates to a particular design of the conveying cartridge itself preferably but not exclusively adapted to be used in connection with so-called pneumatic mail systems.

Conveying cartridges used in conventional pneumatic mail systems are generally cylindrical containers provided at their ends with sealing means cooperating with the walls of the conveying tubes. Due to this general shape of the conveying cartridge the tubes of the conveying system are required to have large radii of curvature involving serious problems in respect to adapting the conveying system to the available space within a building.

SUMMARY OF THE INVENTION

It is a purpose of the present invention to overcome this drawback inherent in systems using conventional cylindrical conveying cartridges. In accordance with the invention a conveying cartridge adapted to be pneumatically conveyed in conduits by positive or negative pressure and comprising, on the one hand, a container for receiving the material to be conveyed and, on the other hand, means performing a sealing action between the container and the conveying conduit is characterized by being provided with a single sealing means shaped as at least a part of a sphere.

It is the basic concept of the invention to design those portions of the conveying cartridge which during passage through the conveying tubes are in contact with the walls thereof and act to form a seal between the conveying cartridge and the tube walls with a spherical or substantially spherical shape, such sphere or sphere section having a diameter which apart from the necessary play equals the diameter of the tubular conduit. A conveying cartridge of completely or partly spherical shape will permit abrupt curvature of the conveying conduit or tube due to the fact that such conveying cartridge unimpededly may change its orientation in the conveying tube without impairing the seal between the tube wall and the conveying cartridge. Thus by using a substantially or partly spherical conveying cartridge the conveying tubes may be given a considerably narrower curvature and the outer radius of curvature of such tubes may even be reduced to the diameter of the sphere whereby the inner radius of curvature will assume the value zero. The curvature of the tubes may thus amount to 90° or more.

In a basic embodiment the conveying cartridge as a whole has the shape of a sphere. As in this case it is not possible to enclose within the conveying cartridge articles or material having a length dimension in excess of the inner diameter of the sphere it may in many cases be preferable to design only the sealing portions of the conveying cartridge with a spherical configuration whereas the portion of the cartridge adapted to receive the material to be conveyed is given a longitudinal dimension in excess of and a transverse dimension smaller than the spherical sealing portion.

According to a further aspect of the invention the conveying cartridge may be enabled to convey articles having a length in excess of the diameter of the sphere by providing the body with a "trailer" which, for example, may comprise a container integral with or attached to a spherical sealing cartridge, such container possibly being articulated at one or more intermediate positions, such articulation, if necessary, being of a universal character.

Some embodiments of the conveying cartridge according to the invention are hereafter described by reference to the enclosed drawing in which.

DESCRIPTION OF THE PREFERRED EMBODIMENTS

Figure 1A:
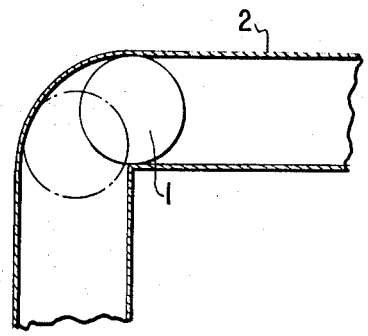
FIG. 1a and 1b show a fully spherical conveying cartridge
Figure 1B:
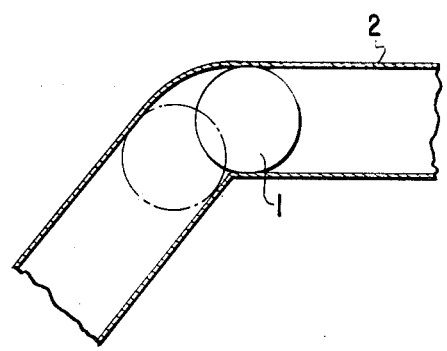

The conveying cartridge shown in FIGS. 1a and 1b comprises a hollow sphere 1 which is adapted to pass through a conveyor tube 2 in sealing contact with the tube wall along a great circle on the circumference of the sphere. The objects or material to be conveyed are enclosed within the conveying cartridge which for this purpose is provided with some kind of shutter (not shown). The spherical conveying cartridge 1 is propelled through tube conduit 2 by negative or positive pressure acting on one side of the cartridge longitudinally of the tube conduit. Successful propulsion requires an efficient seal between the conveying cartridge and the conveying tube 2 during every phase of the relative movement and, accordingly, also during passage of the cartridge through such narrow curves as are shown in FIGS. 1a and 1b. As maintained previously conventional cylindrical conveying cartridges cannot be used in conveying tubes exhibiting narrow curves whereas a conveying cartridge according to the present invention, as appears from FIGS. 1a and 1b, will be able to pass with the sealing cooperation between cartridge and tube wall maintained even through such bends of the conveying tube in which the inner radius of the curvature is zero although in actual practice it may be preferable in respect to wearing conditions slightly to round the inner tube bend. This surprising property of the conveying cartridge according to the invention which is due to the spherical shape of the sealing portions thereof will be explained more closely by reference to the embodiment according to FIG. 2.

Figure 2:
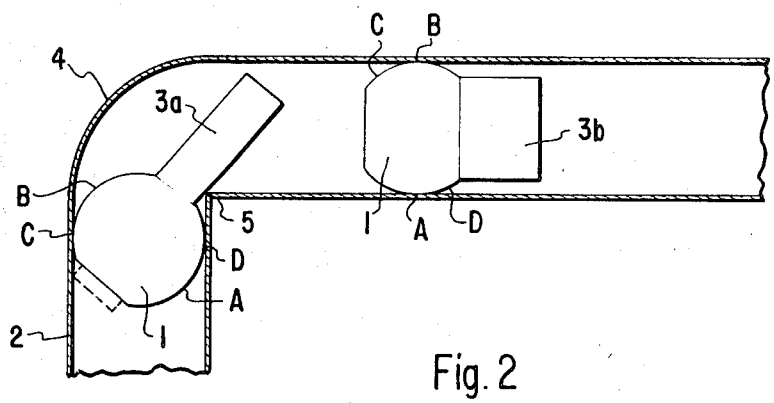
FIG. 2 shows two modified embodiments of the conveying cartridge in which only the sealing portion proper is spherical whereas the container is cylindrical.

In the embodiment shown in FIG. 2 the conveying cartridge, comprises, on the one hand, a sealing portion 1 having the shape of a truncated sphere and, on the other hand, a container 3 shaped as a hollow cylinder having a diameter less than the diameter of the sealing portion 1. The cylindrical container 3 is either integral with the sealing portion 1 or attached thereto and is preferably provided rearwardly of the sealing portion seen in relation to the direction of propulsion. Also in this embodiment the sealing portion 1 is suitably hollow and its interior cavity is preferably in direct communication with the interior cavity of the cylindrical portion 3 thus permitting the cargo to extend through both these cavities.

Prior to arriving at the bend 4, i.e., while occupying the position shown to the right in FIG. 2 the conveying cartridge is in contact with the conveying conduit 2 along a great circle passing through points A and B. During passage through bend 4 the cylindrical portion 3 will contact the angular or rounded corner 5 whereby the orientation of the sealing portion 1 within the conveying tube 2 will be changed and the sealing portion will abut against the walls of the conveying tube along a great circle which no longer passes through points A and B but instead passes through points C and D. However this change of orientation is without effect on the sealing properties of the conveying cartridge because both great circles through respectively points A–B and C–D are of the same diameter.

Figure 3:
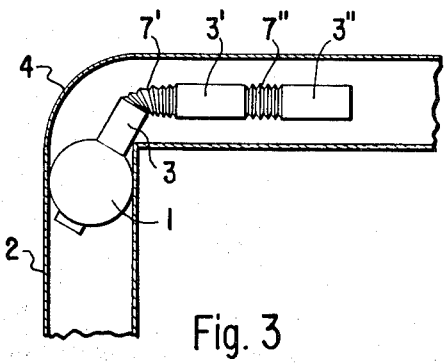
FIGS. 3 and 4 illustrate examples of conveying cartridges comprising articulated containers of substantially greater length than the diameter of the spherical sealing portions.

In FIG. 3 there is shown a "trainlike" embodiment of the conveying cartridge according to the invention. This construction is in particular suited for transporting long and flexible articles. Also here the spherical sealing portion 1 is integrally combined with a cylindrical container 3 which in this case even slightly extends beyond the forward end of the sealing portion 1 and which may be provided with gliding or rolling guide means at its forward end. In addition, the conveying cartridge comprises a number of hollow cylinders two of which are shown in FIG. 3 and are designated as respectively 3' and 3''. Cylinder 3' is attached to cylinder 3 by means of a bellows 7' whereas cylinder 3'' is attached to cylinder 3' by means of a bellows 7''. In this way it is possible to provide a continuous cavity extending from the forward end of sphere 1 to the rear end of cylinder 3'' whereby articles having a corresponding length may be conveyed through the narrow bend 4 provided that the articles are flexible together with the bellows 7' and 7''.

Figure 4:
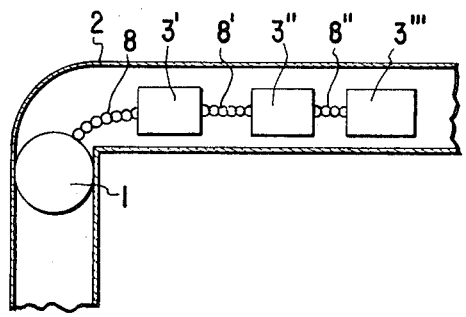

FIG. 4 illustrates another way of increasing the capacity of the transport cartridge. In this embodiment simple chain couplings 8, 8', 8'' are substituted for the bellows 7' and 7'' of the FIG. 3 embodiment, these chain couplings interconnecting a sphere 1 serving both as sealing member and goods container and three cylindrical cargo containers 3', 3'' and 3'''. In contradistinction from the embodiment illustrated in FIG. 3 the embodiment according to FIG. 4 does not offer a continuous cargo space between sphere 1 and containers 3', 3'', 3''', the transport cartridge rather providing four separate cargo accommodating cavities the length of which corresponds to respectively the inner diameter of the sphere and the inner longitudinal dimension of the containers.

Obviously the invention is not limited to the embodiments described above and illustrated in the drawings but comprises any modification obvious to the expert within the frame of the basic inventive idea involving the use of a wholly or partly spherical sealing portion, the expression "spherical" being intended to comprise also cartridges which are not spherical in the strict mathematic sense of the word but for example have the shape of an ellipsoid the central portion of which performs the required sealing function exactly as a corresponding sphere section. The cargo containers integral with or attached to the sealing portion may be modified in many respects. For example, the container 3 shown in FIG. 2 may extend from the sealing portion 1 at two diametrically opposed positions as indicated at the forward end of the cartridge shown to the left in FIG. 2. The cargo container must not necessarily be of cylindrical form but may for example be conical. As shown in FIG. 2 it is possible in connection with a given tube diameter and a given radius of curvature to choose either a narrow and long container 3a or a shorter but thicker container 3b depending on the type of cargo to be conveyed. The same applies of course in respect to the cargo containers of the embodiments according to FIG. 3 and 4, which also may be interconnected by means different from but functionally equivalent to bellows 7' and 7'' and chains, 8, 8' and 8'' respectively.

I claim:

1. A cargo-conveying cartridge for a pneumatic cylindrical tube conveying system comprising, in combination:
    a. a single sealing member having substantially the shape of a truncated sphere and its spherical portion having a diameter such that it engages the inner cylindrical surface of the cylindrical tube along a great circle of said spherical portion; and
    b. an elongated cargo-container radially extending from at least one side of said sealing member to present at least one longitudinal extremity of said cartridge, said container being of substantially lesser diameter than the spherical portion of said sealing member and having a free-length such that said cartridge can pass through sharp bends in the tube while said sealing member remains in sealing contact with the inner-cylindrical surface of the tube along a great circle of contact, said sealing member and said cargo container both having hollow cavities to permit cargo to be conveyed to extend into said cavities.

2. A cargo-conveying cartridge as claimed in claim 1, wherein said cargo container extends rearwardly from the spherical sealing members in relation to the direction of propulsion.

3. A cargo-conveying cartridge as claimed in claim 1, wherein the cargo container extends from the spherical sealing member at two diametrically opposed places.

4. A cargo-conveying cartridge as claimed in claim 1, wherein a plurality of cargo containers are interconnected by means of flexible couplings and attached to the sealing member.

5. A cargo-conveying cartridge as claimed in claim 1, wherein the cargo containers are mutually connected by means of bellows to form a continuous cargo receiving space extending through all cargo containers.

* * * * *